United States Patent [19]
Smith

[11] Patent Number: 5,343,046
[45] Date of Patent: Aug. 30, 1994

[54] DETECTOR COLLIMATOR FOR MOVING FILTER MEDIA

[76] Inventor: David L. Smith, 303 Hudson Ave., Beacon, N.Y. 12508

[21] Appl. No.: 970,684

[22] Filed: Nov. 4, 1992

[51] Int. Cl.$^5$ ............................................. G01T 7/00
[52] U.S. Cl. ................................................ 250/432 R
[58] Field of Search ................................... 250/432 R

[56] References Cited
FOREIGN PATENT DOCUMENTS 2499250  8/1982  France ............................ 250/432 R
58-103678  6/1983  Japan ............................. 250/432 R Primary Examiner—Constantine Hannaher
Attorney, Agent, or Firm—Brooks Haidt Haffner & Delahunty

[57] ABSTRACT

Radioactivity of particles collected on a moving web of filter material is collimated by means of an aperture whose width decreases generally exponentially in the direction of web movement whereby the fractional rate of activity removal that results from web movement is detected as a first order process so that changes in the rate of particle collection can be measured.

17 Claims, 3 Drawing Sheets

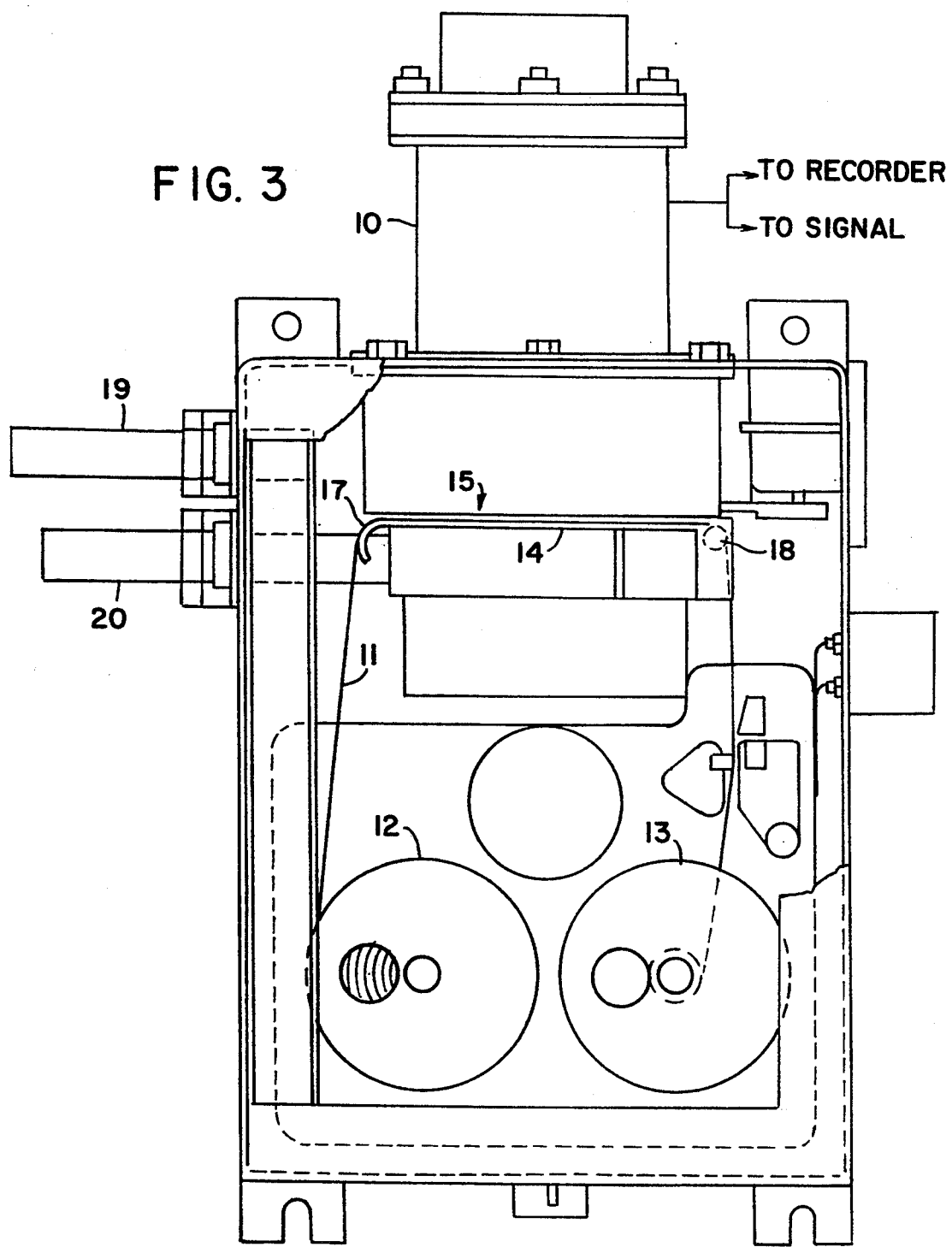

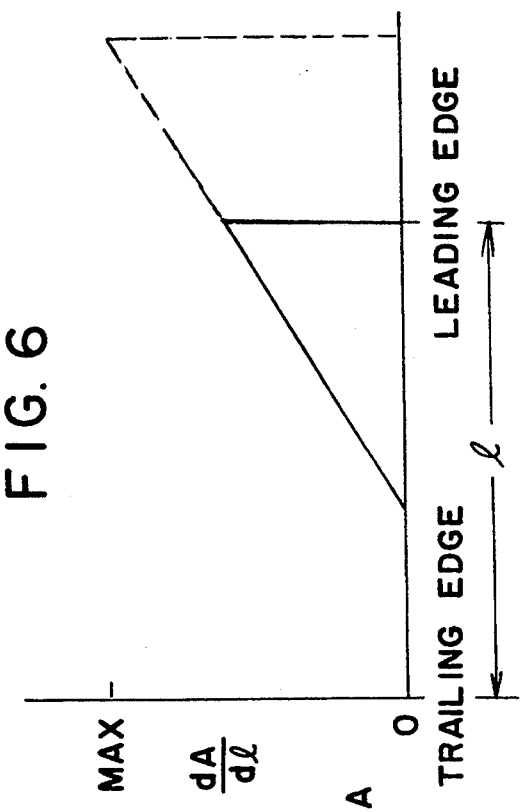
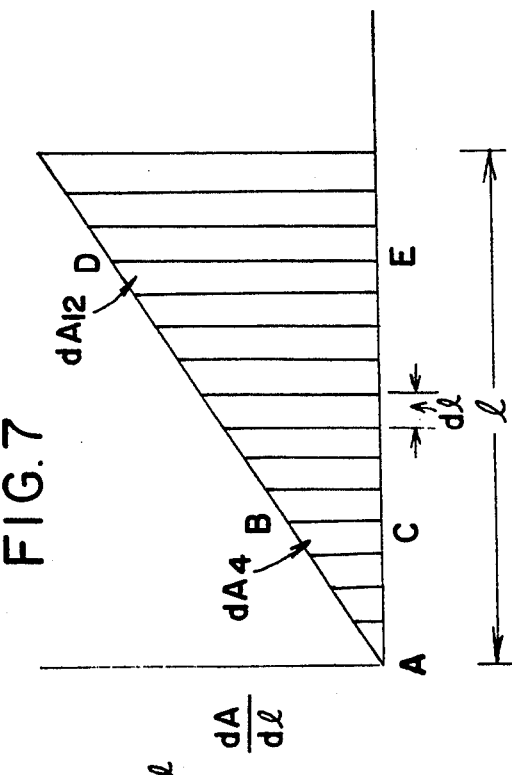
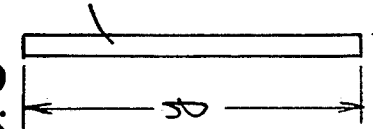
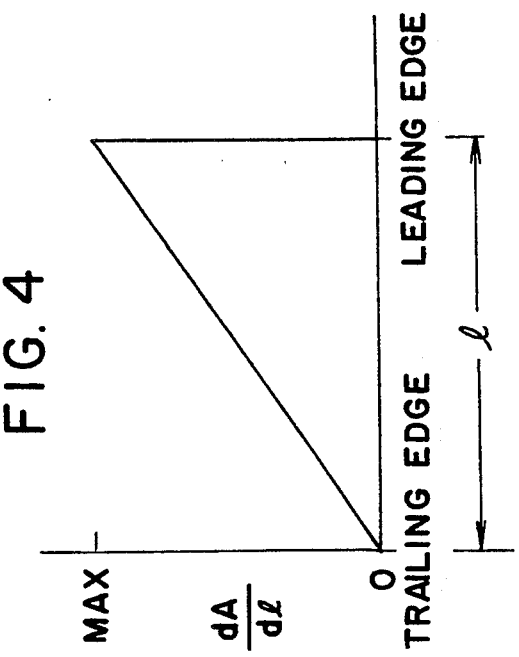
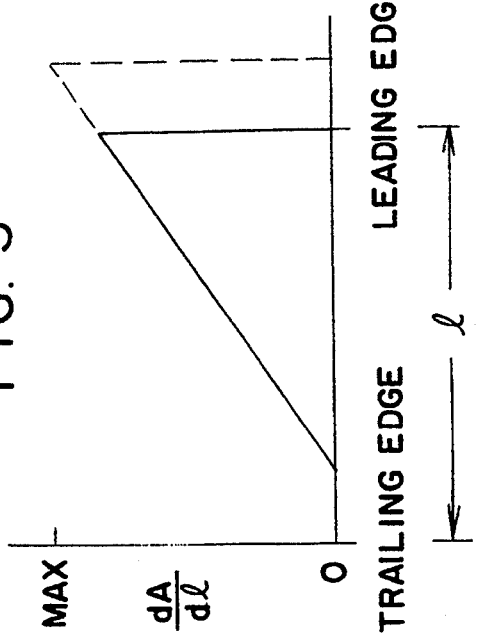

DETECTOR COLLIMATOR FOR MOVING FILTER MEDIA

BACKGROUND OF THE INVENTION

1. Field of the Invention

The invention relates to the monitoring of airborne particulate radioactivity, and in particular to collimation of radiation emitted by particles on a moving web of a filter medium to measure leakage from a reactor coolant system into the containment of a nuclear reactor.

2. Description of Related Art

Safe operation of nuclear power plants requires the prompt detection of leakage of reactor coolant water. The detection and monitoring of leakage of reactor coolant water into the containment area provides information to operators which permits them to take corrective action when a leak may be detrimental to the safety of a facility. Prompt availability of quantitative information can enable operators to act quickly in response to a change in the rate of leakage.

A limited amount of leakage is expected from the reactor coolant system. Valve stem packing glands, circulating pump seals and other equipment cannot be made totally leakproof. The reactor vessel closure seals and safety relief valves should not leak significantly, and any such leakage should be collectible and isolated from the containment atmosphere so as not to mask any potentially serious leak which could occur from a source such as a crack in a pipe.

Uncollected leakage to the containment atmosphere increases the humidity of the containment. The moisture removed from the atmosphere together with any liquid leakage is collected in sumps or tanks where the flow rate can be detected and monitored during plant operation, but maintaining a water inventory balance requires several hours of analysis per day, and does not provide a prompt indication of a change in leakage rate.

Reactor coolant normally contains sources of radiation which, when released to the environment, can be detected by monitoring systems. Reactor coolant radioactivity can be expected to be low during the initial startup of a reactor and for a few weeks thereafter until activated corrosion products have been formed and fission products become available from failed fuel elements. Some leak detection systems are more sensitive than others and are thus better suited for use when coolant radioactivity is low.

Leak detection methods now in use include monitoring of sump-flow and airborne particulate activity, monitoring of condensate flow from air coolers and monitoring of airborne gaseous radioactivity. Most power plants employ several leakage detection methods. In the United States, federal regulations recommend that reactor operators should be able to detect a coolant leakage rate to the containment of one gallon (about 3.79 liters) per minute within one hour of the start of such a leak.

The ability to detect a change in leakage rate promptly can avoid false alarms resulting from belated detection of unexplained leakage and thereby reduce unnecessary and costly shutdowns by permitting early identification of leak sources and prompt corrective action.

The continuous sampling of air from within a reactor containment and detection of airborne particulate radioactivity is an effective way of detecting coolant leakage. One means for detecting particulate radioactivity employs a moving web of filter paper exposed to a flow of air for collection of particles from the air flow. The moving web which has been exposed to the air stream and has collected radioactive particles is caused to pass a detector to measure the radioactivity emitted by particles on the filter paper web. In this application, the term "activity" is sometimes used, for the sake of brevity, to mean the radioactivity of the particles collected on such a web. Changes in the intensity of radiation sensed by the detector correspond to changes in coolant water leakage within the containment from which the sampled air is derived.

The coolant water circulating in a pressurized light water reactor contains, among other things, the radioactive isotope of krypton, $Kr^{88}$, which decays by negative beta emission to the radioactive rubidium isotope $Rb^{88}$, which also decays by negative beta emission. The half-life of $Rb^{88}$ is 17.8 minutes. The relatively short half-life of $Rb^{88}$ makes its presence useful as an indicator of coolant leakage, since its decay is much more noticeable than that of such longer lived species as $Co^{60}$ and $Cs^{137}$ which may also be present in the reactor coolant water.

When coolant water carrying $Kr^{88}$ escapes from the coolant system through leakage the krypton is essentially uniformly distributed throughout the volume of gases within the containment vessel. Continuous sampling and monitoring of the containment atmosphere for the presence of the daughter $Rb^{88}$ can accordingly reveal the history of leakage within the containment. The present technology for performing this monitoring consists of passing the sampled air through a moving web of filter paper so that $Rb^{88}$ is collected by the paper. The moving filter paper web passes a detector such as a scintillometer or geiger-mueller detector for sensing beta particle emission from the web, producing a signal representative at any given time of the total activity of that area of the web then being viewed by the detector. Changes over time in the amount of activity sensed show changes in leakage of coolant water to the containment atmosphere. Conventional display and recording devices are employed to permit plant personnel to monitor changes over time in the amount of detected radiation and thereby respond to signals indicating a change in the rate of coolant leakage. An automatic signal may be activated when the radiation measured or the change in the radiation measured exceeds a predetermined value. This currently employed procedure shows only qualitative differences, and not quantitative differences, because it is not a first order process.

The mathematical processes that have been developed for use in connection with the collection and detection of activity from sampled radioactive atmospheres involve manageable equations which use first order rate constants for all of the removal processes. The major removal processes are radioactive decay (a first order process) and removal by movement of the sample whose activity is being measured. The use of collimation in accordance with the invention makes the activity removal by web movement a first order process with a first order rate constant. The first order rate constants representing radioactive decay and filter web removal from the view of the detector can be readily combined to produce a single first order rate constant.

SUMMARY OF THE INVENTION

The use, according to the present invention, of a collimator interposed between a moving web of filter material and a detector that measures radiation emitted by particles collected by the moving web, makes it possible to monitor airborne particulate radioactivity and to determine quantitative changes in such radioactivity. Various applications of the apparatus and process of this invention will suggest themselves to those skilled in the art of radiation detection. The invention is particularly useful in monitoring airborne particulate radioactivity to detect the occurrence of leaks in the coolant water systems of nuclear power plants, and the invention is described as used in reactor coolant leakage detection.

In an airborne particulate radiation monitor of the known type in which particles are deposited on a slowly moving paper web and the web passes a radiation detector so that sequential areas of the web are viewed in succession by the detector, several processes are proceeding simultaneously. Particles are being deposited on the paper. The paper is in motion, so there are fewer particles on the upstream portion of the paper than there are on the downstream portion of the paper that has been exposed for a longer period of time to the flow of particles. The radioactive element deposited on the paper is decaying. In the case of $Rb^{88}$, at a half-life of 17.8 minutes and with a paper web moving at a rate of 1 inch (about 2.54 centimeters) per hour past a detector having a diameter of 2 inches (about 5.08 centimeters), the 2 hours time it takes a given spot on the web to move into, past, and out of the detector's view is considerably longer than the half-life.

Although radioactive decay is a first order process, and the speed of longitudinal movement of the paper web is constant, the amount of radioactivity emitting particles which move out of the view of the detector per unit time is not a first order effect. As a result, prior art detection processes that employ a moving web passing a detector can show only qualitative differences in the airborne radioactivity. They cannot show a quantitative change in the rate of leakage of reactor coolant to the containment, and do not provide the prompt indication of change in leakage rate that operators of reactors desire for taking early and effective corrective action if necessary.

The solution for dealing with this deficiency is the provision of means to assure that a first order effect is detected. The present invention provides a solution by collimation of radiation emitted by the particles on the moving web as the web passes the viewing area of the detector. The object of collimation is to assure that all activity collected on the filter paper, independent of the time at which the activity was collected, has the same probability per unit time of getting away from the view of the detector, no matter where on the moving web the activity has been collected.

This collimation is achieved in accordance with the invention by disposing a collimator between the detector and the moving web for permitting passage of radiation from the web to the detector only through an aperture in the collimator which aperture has a width that decreases generally exponentially in the direction of web movement. The area of the web passing through the zone viewed by the detector is wider at its upstream end and narrower at its downstream end, resulting in detection of an essentially first order process. If the radiation being detected is beta radiation, as in the case of decay of $Rb^{88}$, the collimator can be a relatively thin plate of aluminum or synthetic plastic material which can be mounted on the detector.

The invention is not limited to the detection of coolant leakage changes in nuclear power plants, but can be used in any application where activity on a moving web is monitored.

The objects and advantages of the method and apparatus of the invention will be more fully understood from the following detailed disclosure of a preferred embodiment, especially when the description is read with reference to the accompanying figures of drawing.

BRIEF DESCRIPTION OF THE DRAWINGS

In the drawings, in which like reference numerals designate like parts throughout:

FIG. 3 shows apparatus for transporting a web past a detector.

FIGS. 4–7 and 8–10 are graphic aids to understanding the physical and mathematical principles upon which the method and apparatus of the invention are based.

DESCRIPTION OF PREFERRED EMBODIMENT

Figure 1:
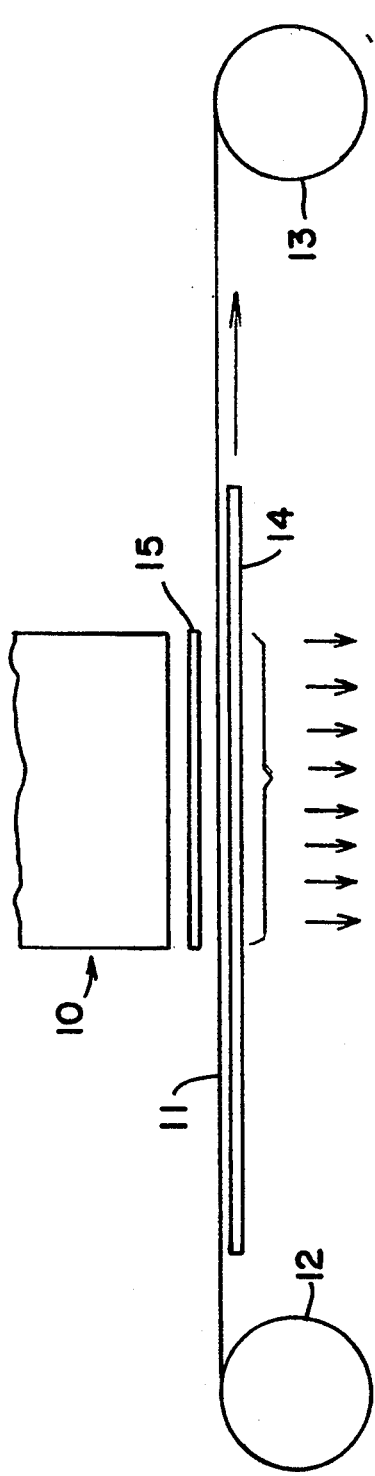
FIG. 1 is a schematic view of apparatus for sensing activity on a moving web.
Figure 2:
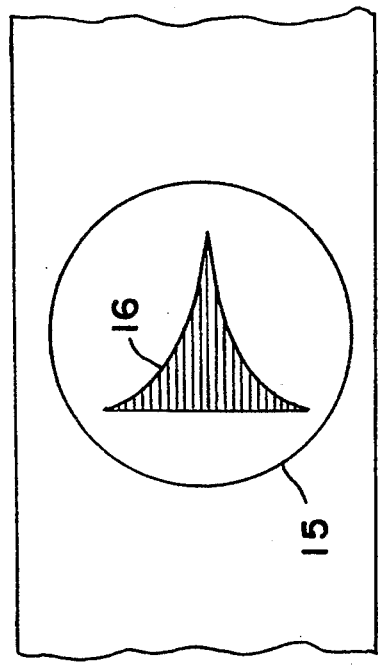
FIG. 2 illustrates a collimator according to the invention from the viewpoint of a detector.

The schematic illustration of FIG. 1 shows a detector 10 facing a web 11 that moves to the right in the sense of the drawing from a supply roller 12 to a take-up roller 13, supported by a grid or other perforated support surface 14 through which a flow of air or other gas can pass in the direction of the arrows. A collimator 15 is interposed between the web 11 and the detector 10 to limit the area of the web 11 that is viewed by the detector 10. Looking down at the web 11 and the collimator 15 from above, as illustrated in FIG. 2, a simplified view in the direction of the arrows in FIG. 1, it can be seen that the collimator 15 has an aperture, generally designated by reference numeral 16, which limits the area of the web 11 that can be observed by the detector 10 as the web 11 moves past the detector 10. A commercially available web transport apparatus which can be adapted for use in accordance with the invention is shown in FIG. 3.

In the apparatus shown in FIG. 3 a filter paper tape is unwound from the supply roll 12 and passes over to curved guide 17 and then transverses the gridwork support 14 before being fed over a paper roller 18 to the take up roll 13. A stream of gas carrying particles of radioactive material is fed in through the conduit 19, passes through the filter paper tape web 11 at the area defined by the grid 14 and exits through the conduit 20 for further testing, recycling or exhaust to the ambient atmosphere. Particles entrained in the air flow are collected on the moving web 11 and sensed by the detector 10. The detector 10 detects radiation emitted by particles deposited on the web 11. A supplier of such monitoring equipment is Victoreen, Inc. of Solon, Ohio, but the present invention can be practiced with other apparatus for moving a web past a detector.

The detector 10 can be a scintillation detector or a geiger-mueller detector, or other suitable detector sensitive to radiation impinging on the detector from a field in front of the detector. This field, ordinarily bounded by a circle, is referred to herein as the "view" of the detector. Radiation from a source outside the detector's view is not sensed by the detector, but it can be assumed that the detector is uniformly sensitive to all radiation within its view. The structure and operation of such detectors is well known to those skilled in the art of radiation measurement and needs no detailed description.

The collimator of the present invention is positioned at the area shown in FIG. 3 and serves to limit the view of the detector selectively so that the activity of any given age deposited on the filter web 11 has the same probability as any other activity of any given age of being detected or escaping detection. That is, all activity collected on the web, independent of the time that it is collected, has the same probability per unit time of escaping from the view of the detector, no matter where on the web it has been collected.

In order to achieve this purpose, which makes detection sensitive to quantitative changes in the rate of deposition of radioactive particles on the moving web, by which changes in the leakage rate of coolant to a nuclear reactor containment can be promptly observed, the collimator should limit the view of the detector to an area of the moving web which decreases in width in the direction of web movement. It can be shown that the decrease of width of the area viewed should be essentially exponential, decreasing from a broad base near where the web enters the field of the detector to a narrow apex near where the web departs from the detector field. The aperture 16 of FIG. 2 is illustrative of this exponential narrowing as the longitudinal side edges of the aperture approach each other. Of course, considerations such as the web speed and the half-life of the radioactive element which is being detected will determine the shape of the aperture, but in any case the width narrows essentially exponentially. Instead of two curved side edges as shown in FIG. 2 the aperture could have a straight base and one straight and one curved side edge defining an exponentially decreasing view area, but the shape of aperture 16 shown has the advantage of being easily aligned with the centerline of the moving web 11 with the aperture base perpendicular to the direction of web movement.

The reason for the exponentially narrowing shape of the collimator can be understood by considering the geometry of the monitoring system. When a strip of filter paper of length 1 passes through the field of a detector at a uniform speed, the strip is exposed to a stream of gas carrying particles which are collected uniformly across the width of the strip. The longer a portion of the strip has been exposed to the particle-bearing flow, the more particles it carries. This is illustrated in FIG. 4, which is based on the assumption that the half-life of radioactive material collected is sufficiently long that no significant decay has occurred during the time it has taken for the leading edge of the strip to traverse the detector field. The trailing edge of the strip in FIG. 4 has just entered the area of exposure to particle-bearing gas and has not yet collected any particles. FIG. 4 shows a constantly increasing density of particles and hence of activity A over the length 1 of the strip in the direction of movement of the strip to a maximum at the leading edge.

FIG. 5 shows the situation after some time has elapsed. The leading edge of the strip has left the field of the detector. Activity from the trapezoidal area of the strip defined by dashed lines at the right in FIG. 5 is out of the detector field and does not contribute to the total detected activity, which is less than that of FIG. 4.

After the lapse of some further time interval the condition is as shown in FIG. 6. More of the forward end of the strip has left the detector's field and the total activity detected has decreased further.

In FIG. 7 the strip of length 1 is subdivided into a plurality of trapezoidal increments of length dl, representing activity of particles collected in transverse bands across the length of the strip.

The amount of activity removed in the time dt that it takes for a portion of the strip to move through length dl, divided by the total activity detected before a transverse band of length dl has left the field of the detector, would be constant if activity were distributed uniformly along the length of the strip. The process would be a first order process: but clearly it is not.

Consider that the triangular area ABC in FIG. 7 represents the condition shown in FIG. 6 when the leading edge of the strip has moved well beyond the field of the detector. The next band to depart from the detector's view is represented by the trapezoidal area $dA_4$ which will leave the detector's field in the time period dt. The fractional rate of activity removal by strip motion alone is:

$$r = \frac{\frac{dA_4}{ABC}}{dt}.$$

Then take the triangular area ADE to represent the condition shown in FIG. 4, when the trapezoidal area $dA_{12}$ represents the activity of the transverse band which will move out of the detector field in the time dt. The removal rate in this situation is:

$$r = \frac{\frac{dA_{12}}{ADE}}{dt}.$$

Clearly these two rates are far from equal. The rate based on $dA_4$ is significantly larger than the rate based on $dA_{12}$. This makes it clear that even though the fraction of the paper removed per unit time is constant, the fraction of activity removed per unit time is not constant. Removal of activity by motion of the filter paper alone is not a first order process.

For a rectangular area of moving filter web, the activity along any line perpendicular to the direction of web motion is constant. That is, the activity is uniformly distributed across the width of the web. The object of collimation according to the invention is to provide a constant fractional rate of activity removal as viewed by the detector as the filter web moves.

Figure 9:
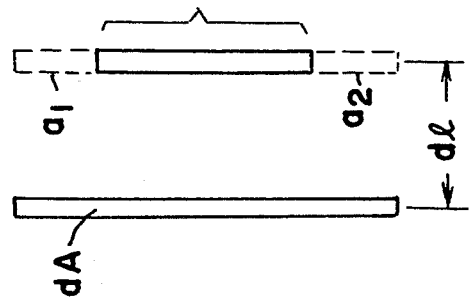

A transverse band or slice of the web is shown in FIG. 8. The band has a width dl and a length y. The total activity of the slice, dA, is equal to y dl times the density of activity. Assume that the activity density is constant, as in the case for a collected radioactive element that has a long half-life, after the collection of particles has stopped. As the slice moves in the direction of web movement, the collimator of the invention blocks a portion of the total activity dA from detection. This is shown in FIG. 9 where the end portions $a_1$ and $a_2$ of the strip, shown in dashed lines, are removed from the detector's view by the collimator. Only activity of the middle portion of the slice is seen through the collimator aperture 16 by the detector 10. The fractional rate of activity removal is thus:

$$k = \frac{a_1 + a_2}{\frac{dA}{dt}}.$$

Figure 10:
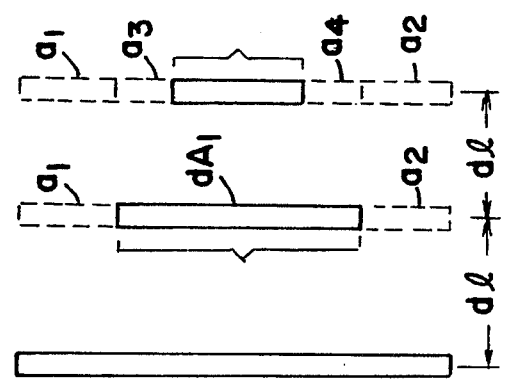

FIG. 10 shows the strip moved another distance dl toward the right, to a position where the portions $a_3$ and $a_4$ of the slice have also been blocked off from the detector view by the collimator. Now $$k = \frac{a_3 + a_4}{\frac{dA_1}{dt}}.$$

For k to be constant, i.e., in order to have a first order detection process, the width of the collimator aperture must decrease essentially exponentially in the direction of web motion, for example, as illustrated by the collimator 15 of FIG. 2.

Collimation according to the invention can be employed by the adapting existing equipment for detection of airborne particulate radioactivity now used in nuclear power plants. For example, a collimator 15 can be attached directly to the detector 10 at the area shown in FIG. 3, spaced a short distance from the surface of the moving web of filter paper 11. Although $Rb^{88}$ is a highly active emitter of beta radiation, and the detector 10 could be several inches away from the web 11, for geometric reasons, it is desirable to have the detector as close as practically possible. Since aluminum and some synthetic plastics are good absorbers of beta particles, the collimator can be formed as a thin sheet, allowing the detector to be spaced only a fraction of an inch from the surface of the filter paper web.

Other applications of collimation according to the invention besides detection of leakage of coolant in nuclear power plants will suggest themselves to those skilled in the art. The method and collimator of the invention are useful in a variety of applications where radiation emitted by particles collected on a moving filter web is detected.

I claim:

1. Apparatus for monitoring the amount of particles containing a radioactive element being deposited over time on a moving web of filter material to detect changes in the rate of particle deposition, comprising a radiation detector facing an area of the web upon the entirety of which area particles are being deposited and having a view of said area of the web upon the entirety of which area particles are being deposited so that radiation detection and particle deposition proceed simultaneously throughout the entire area and a collimator disposed between the detector and the web for limiting the view of the detector, the collimator permitting passage of radiation from the web to the detector only through an aperture which has a width that decreases generally exponentially in the direction of web movement so that there is a constant fractional rate of removal of deposited particles from the view of the detector caused by movement of the web whereby detection is sensitive to quantitative changes in the rate of deposition of particles on the moving web.

2. The apparatus of claim 1 wherein the aperture is defined along its length in the direction of movement of the web by symmetrical, generally exponentially curved side edges.

3. The apparatus of claim 1 wherein the collimator is made of a material selected to block the passage of beta radiation.

4. The apparatus of claim 1 wherein the collimator is mounted on the radiation detector.

5. The apparatus of claim 1 and including means for directing to the web a stream of gas carrying particles whose radioactivity is detected.

6. A method for monitoring the amount of particles containing a radioactive element deposited over time on a moving web of filter material and for detecting change in the rate of deposition of particles, comprising using a radiation detector having a limited view of an area of the web upon the entirety of which area particles are being deposited so that radiation detection and particle deposition proceed simultaneously throughout the entire area to measure radiation emitted by the particles on the moving web while collimating the radiation emitted for detection of radiation emitted only from said area of the web within the view of the detector which has a width which decreases generally exponentially in the direction of web movement so that there is a constant fractional rate of removal of deposited particles from the view of the detector caused by movement of the web whereby detection is sensitive to quantitative changes in the rate of deposition of particles on the moving web.

7. The method of claim 6 and including directing a stream of gas carrying particles to the moving web.

8. The method of claim 6 comprising operating the radiation detector continuously.

9. The method of claim 6 wherein the particles contain radioactive rubidium.

10. The method of claim 6, including recording the amount of radiation measured.

11. The method of claim 6 including actuating a signal when the rate of deposition of particles detected changes by more than a predetermined limit.

12. A method for monitoring leakage of coolant liquid in a nuclear power plant comprising withdrawing gases from a reactor containment, causing the withdrawn gases to contact a moving web of filter material so that radioactive particles are collected on the web of filter material, using a radiation detector having a limited view of an area of the web upon the entirety of which area particles are being deposited so that radiation detection and particle deposition proceed simultaneously to measure radiation emitted by particles on the web while collimating the radiation emitted for detection of radiation emitted only from said area of the web which has a width which decreases generally exponentially in the direction of web movement so that there is a constant fractional rate of removal of deposited particles from the view of the detector caused by movement of the web whereby detection is sensitive to quantitative changes in the rate of deposition of particles on the moving web.

13. The method of claim 12 wherein the particles collected include radioactive rubidium and the radiation detected is beta radiation.

14. The method of claim 12 wherein the monitoring is carried out continuously for measuring changes in coolant leakage.

15. A radiation collimator comprising a sheet of material formed as a disc which blocks the passage of radiation and having an aperture defined and encompassed within and passing through the disc for the passage of radiation, which aperture has a width which decreases generally exponentially in one direction along a diameter of the disc.

16. The collimator of claim 15 wherein the aperture is defined by curved side edges which approach each other along an exponential curve.

17. The collimator of claim 15 wherein the material absorbs beta radiation.

* * * * *